United States Patent [19]
Aimura et al.

[11] Patent Number: 5,830,941
[45] Date of Patent: Nov. 3, 1998

[54] VULCANIZABLE RUBBER COMPOSITION AND HOSE

[75] Inventors: Yoshiaki Aimura; Suguru Ito; Tsuyoshi Konno, all of Kawasaki, Japan

[73] Assignee: Nippon Zeon Co., Ltd., Tokyo, Japan

[21] Appl. No.: 739,950

[22] Filed: Oct. 30, 1996

[30] Foreign Application Priority Data

Oct. 31, 1995 [JP] Japan .................................. 7-306462

[51] Int. Cl.⁶ ...................................................... C08J 3/34

[52] U.S. Cl. .............................................. 524/456

[58] Field of Search .............................. 524/456

[56] References Cited

U.S. PATENT DOCUMENTS 4,988,548   1/1991   Takemura et al. ...................... 525/104

*Primary Examiner*—Peter D. Mulcahy
*Attorney, Agent, or Firm*—Armstrong, Westerman, Hattori, McLeland & Naughton

[57] ABSTRACT

A vulcanizable rubber composition comprising (1) a hydrogenated product of an unsaturated nitrile-conjugated diene-unsaturated carboxylic acid ester copolymer, (2) an ultrafine magnesium silicate powder having an average particle diameter of not larger than 10 $\mu$m and (3) a vulcanizer. This rubber composition gives a vulcanizate having good resistance to hydrofluorocarbon gas transmission and good cold resistance, and is useful for a hose for hydrofluorohydrocarbon gas.

18 Claims, No Drawings

VULCANIZABLE RUBBER COMPOSITION AND HOSE

BACKGROUND OF THE INVENTION

(1) Field of the Invention

This invention relates to a vulcanizable rubber composition comprising a nitrile group-containing highly saturated copolymer rubber, and a hose made of a vulcanizate thereof.

This vulcanizable rubber composition gives a vulcanized rubber product having an enhanced cold resistance and a reduced permeability to hydrofluorocarbon gases, and thus is especially useful as a rubbery material for hydrofluorocarbon gas hoses for low temperature use.

(2) Description of the Related Art

It is well known that a nitrile group-containing highly saturated copolymer rubber which is obtained by hydrogenating the conjugated diene part of an unsaturated nitrile-conjugated diene copolymer rubber has a high resistance to hydrofluorocarbon gas transmission. Thus, many rubber compositions comprising a nitrile group-containing highly saturated copolymer rubber have heretofore been proposed. As examples of the proposed rubber compositions, there can be mentioned a rubber composition used for an O-ring of a refrigerator compressor, which comprises a nitrile group-containing highly saturated copolymer rubber and a specific amount of carbon black (Japanese Unexamined Patent Publication [hereinafter abbreviated to "JP-A"] No. 60-223838); a rubber composition exhibiting an enhanced resistance to a hydrofluorocarbon refrigerant carrier, which comprises a nitrile group-containing highly saturated copolymer rubber having a Mooney viscosity of at least 100 and an organic peroxide (JP-A 5-65369); and a rubber composition exhibiting an improved resistance to a refrigerant carrier, which comprises a nitrile group-containing highly saturated copolymer rubber, carbon black and white carbon having a limited specific surface area (JP-A 7-118447).

In recent years, there is an increasing demand for hydrofluorocarbon gas hoses and other automobile parts, which have a broad service temperature range spanning from a cold temperature to a high temperature. A nitrile group-containing highly saturated copolymer rubber provides a rubbery material exhibiting high heat resistance, weather resistance and oil resistance, but having a poor cold resistance. To enhance the cold resistance, a nitrile group-containing highly saturated copolymer rubber composition has been proposed in JP-A 63-95242, which comprises a hydrogenated product of an unsaturated nitrile-conjugated diene-unsaturated carboxylic acid ester copolymer rubber. The proposed nitrile group-containing highly saturated copolymer rubber composition provides rubbery material having an improved cold resistance without substantial reduction of heat resistance and other properties, but, when the rubbery material is used for hydrofluorocarbon gas hoses, the hoses exhibit an undesirably large permeability to hydrofluorocarbon gases, and the swelling with a refrigerator oil is not negligible with resulting deterioration in sealability.

SUMMARY OF THE INVENTION

In view of the foregoing, a primary object of the present invention is to provide a vulcanizable rubber composition which gives a vulcanizate exhibiting high resistance to permeation by hydrofluorocarbon, hydrochlorofluorocarbon and chlorofluorocarbon gases (which are referred to generically as "flon" gas in this specification), as well as good cold resistance.

Another object of the present invention is to provide a hose made of a vulcanizate of the rubber composition and exhibiting high resistance to permeation by hydrofluorocarbon, hydrochlorofluorocarbon and chlorofluorocarbon gases, as well as good cold resistance.

In one aspect of the present invention, there is provided a vulcanizable rubber composition comprising a nitrile group-containing highly saturated copolymer rubber, an ultrafine magnesium silicate powder having an average particle diameter of not larger than 10 µm and a vulcanizer; said nitrile group-containing highly saturated copolymer rubber being obtained by hydrogenating the conjugated diene part of an unsaturated nitrile-conjugated diene-unsaturated carboxylic acid ester copolymer.

In another aspect of the present invention, there is provided a hose made of a vulcanizate of the above-mentioned vulcanizable rubber composition comprising the nitrile group-containing highly saturated copolymer rubber.

DESCRIPTION OF THE PREFERRED EMBODIMENTS

The nitrile group-containing highly saturated copolymer used in the present invention is obtained by hydrogenating the conjugated diene part of an unsaturated nitrile-conjugated diene-unsaturated carboxylic acid ester copolymer, and preferably has a Mooney viscosity of 15 to 200, more preferably 30 to 100, and preferably an iodine value of not larger than 80, more preferably not larger than 40. If the Mooney viscosity is too small, the vulcanized rubber product may have insufficient strength. In contrast, if the Mooney viscosity is too large, the viscosity of the rubber composition may be undesirably large and the molding more difficult. If the iodine value is too large (i.e., the degree of unsaturation is high), the heat resistance and weather resistance may be lowered. There is no critical lower limit for the iodine value, but the practical lower limit thereof is usually 1. When the iodine value is smaller than 1, the vulcanization may become difficult.

The content of unsaturated nitrile units in the unsaturated nitrile-conjugated diene-unsaturated carboxylic acid ester copolymer is usually 10 to 40% by weight, preferably 15 to 30% by weight, based on the weight of the copolymer. The unsaturated nitrile includes, for example, acrylonitrile, methacrylonitrile and α-chloroacrylonitrile. Of these, acrylonitrile is preferable.

The content of conjugated diene units in the unsaturated nitrile-conjugated diene-unsaturated carboxylic acid ester copolymer is usually in the range of 10 to 70% by weight, preferably 30 to 60% by weight, based on the weight of the copolymer. The conjugated diene includes, for example, 1,3-butadiene, 2,3-dimethylbutadiene, isoprene and 1,3-pentadiene. Of these, 1,3-butadiene is preferable.

The content of unsaturated carboxylic acid ester units in the unsaturated nitrile-conjugated diene-unsaturated carboxylic acid ester copolymer is usually 1 to 80% by weight, preferably 15 to 60% by weight, more preferably 20 to 40% by weight, based on the weight of the copolymer. The unsaturated carboxylic acid ester gives a rubber vulcanizate having good and balanced ozone resistance, heat resistance and cold resistance. If the content of the unsaturated carboxylic acid ester units in the copolymer is too small, these advantages cannot be obtained and especially the cold resistance is poor. If the content of the unsaturated carboxylic acid ester units in the copolymer is too large, the heat resistance is lowered.

As specific examples of the unsaturated carboxylic acid ester, there can be mentioned acrylates and methacrylates, which have an alkyl group with 1 to about 18 carbon atoms, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate;

acrylates having an alkoxyalkyl group with 2 to about 12 carbon atoms, such as methoxymethyl acrylate, methoxyethyl acrylate, ethoxyethyl acrylate, butoxyethyl acrylate, ethoxypropyl acrylate, methoxyethoxy acrylate and ethoxybutoxy acrylate;

acrylates having a cyanoalkyl group with 2 to about 12 carbon atoms, such as α- and β-cyanoethyl acrylates, α-, β- and γ-cyanopropyl acrylates, cyanobutyl acrylates, cyanohexyl acrylates and cyanooctyl acrylates;

acrylates having a hydroxyalkyl group with 1 to 8 carbon atoms, such as 2-hydroxyethyl acrylate and hydroxypropyl acrylate;

mono-alkyl and di-alkyl esters of an unsaturated dicarboxylic acid having an alkyl group with 1 to 8 carbon atoms, such as monoethyl maleate, dimethyl maleate, dimethyl fumarate, diethyl fumarate, di-n-butyl fumarate, di-2-ethylhexyl fumarate, dimethyl itaconate, diethyl itaconate, di-n-butyl itaconate and di-2-ethylhexyl itaconate;

amino group-containing unsaturated carboxylic acid esters such as dimethylaminomethyl acrylate, diethylaminoethyl acrylate, 3-(diethylamino)-2-hydroxypropyl acrylate and 2,3-bis(difluoroamino) propyl acrylate;

acrylates and methacrylates, which have a fluoroalkyl group with 1 to 10 carbon atoms, such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl acrylate, trifluoroethyl methacrylate, tetrafluoropropyl methacrylate, octafluoropentyl methacrylate, dodecafluoroheptyl methacrylate, pentadecafluorooctyl methacrylate and hexadecafluorononyl methacrylate; and fluorine-substituted benzyl acrylates and methacrylates, such as fluorobenzyl acrylate, fluorobenzyl methacrylate and difluorobenzyl methacrylate.

Of these examples of the unsaturated carboxylic acid esters, dialkyl esters of an unsaturated dicarboxylic acid are preferable.

Provided that the intended effect of the present invention can be obtained, other copolymerizable monomers may be used in combination with the unsaturated nitrile, conjugated diene and unsaturated carboxylic acid ester. As specific examples of the copolymerizable monomers, there can be mentioned vinyl monomers such as styrene, α-methylstyrene and vinylpyridine; non-conjugated dienes such as vinylnorbornene, dicyclopentadiene and 1,4-hexadiene; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o- or p-trifluoromethylstyrene, vinyl pentafluorobenzoate, difluoroethylene and tetrafluoroethylene; unsaturated carboxylic acids such as acrylic acid and methacrylic acid; unsaturated dicarboxylic acids such as itaconic acid, fumaric acid and maleic acid, and their anhydrides; and polyethylene glycol acrylate, polyethylene glycol methacrylate, polypropylene glycol acrylate, polypropylene glycol methacrylate, epoxy acrylate, epoxy methacrylate, urethane acrylate and urethane methacrylate. The content of the copolymerized monomer units in the unsaturated nitrile-conjugated diene-unsaturated carboxylic acid copolymer is usually not larger than 10% by weight, preferably not larger than 5% by weight, based on the weight of the copolymer.

The method of hydrogenating the conjugated diene part of the unsaturated nitrile-conjugated diene-unsaturated carboxylic acid copolymer is not particularly limited, and the copolymer can be hydrogenated by the conventional method. As examples of a catalyst used for hydrogenation, there can be mentioned palladium/silica and palladium complexes described in JP-A 3-252405, and rhodium and ruthenium compounds described in JP-A 62-125858, 62-42937, 1-45402, 1-45403, 1-45404 and 1-45405.

The nitrile group-containing highly saturated copolymer rubber used in the present invention can be obtained by directly hydrogenating a latex of the unsaturated nitrile-conjugated diene-unsaturated carboxylic acid ester copolymer. The method of directly hydrogenating the copolymer latex is not particularly limited. As examples of the method of directly hydrogenating a latex of the copolymer, there can be mentioned a method using a palladium catalyst described in, for example, JP-A 2-178305, a method using a rhodium catalyst described in, for example, JP-A 59-115303, 56-133219, U.S. Pat. No. 3,898,208, and a method using ruthenium catalyst described in, for example, JP-A 6-184, 223 and 6-192323. More specifically, taking as an example the method using a palladium catalyst described in JP-A 2-178305, an organic solvent capable of dissolving or swelling therein the nitrile group-containing unsaturated copolymer is incorporated in an aqueous latex of the copolymer whereby the copolymer is swollen and the unsaturated double bonds in the copolymer become easily accessible to the catalyst, and thus, the hydrogenation can be effected with great efficiency while the copolymer is in the state of an aqueous emulsion.

The palladium compound used as the catalyst for hydrogenation is not particularly limited. As examples of the palladium compound, there can be mentioned palladium-containing inorganic compounds and complexes, for example, palladium salts of carboxylic acids such as formic acid, acetic acid, propionic acid, lauric acid, succinic acid, stearic acid, oleic acid, phthalic acid and benzoic acid; chlorides of palladium such as palladium chloride, dichloro (cyclooctadiene)palladium, dichloro(norbornadine) palladium, dichloro(benzonitrile)palladium, dichlorobis (triphenylphosphine)palladium, ammonium tetrachloropalladate(II) and ammonium hexachloropalladate (IV); palladium bromide, palladium iodide, palladium sulfate dihydride, and potassium tetracyanopalladate(II) trihydride. Of these, palladium salts of carboxylic acids, dichloro (norbornadiene)palladium and ammonium hexachlorpalladate are preferable.

The ultrafine magnesium silicate powder incorporated in the rubber composition of the present invention has an average particle diameter of not larger than 10 μm, preferably not larger than 8 μm and more preferably not larger than 1 μm, and preferably has a flat shape. The ultrafine magnesium silicate powder is usually made by a process wherein hydrous magnesium silicate is pulverized, classified and then the classified product is calcined. Usually the ultrafine magnesium silicate powder is a mixture predominantly comprised of silicon dioxide and magnesium oxide and has a pH value of 8 to 10, a specific gravity of 2.5 to 3.0 and a surface area of 1 to 30 mm$^2$/g. Most preferable ultrafine magnesium silicate powder has an average particle diameter of not larger than 1 μm and a surface area of at least 15 mm$^2$/g.

The incorporation of the ultrafine magnesium silicate powder is important for enhancement of the resistance to permeation by flon gas. The amount of the ultrafine magnesium silicate powder is not particularly limited, but is usually 20 to 200 parts by weight, preferably 40 to 100 parts by weight, based on 100 parts by weight of the nitrile group-containing highly saturated copolymer rubber.

The ultrafine magnesium silicate powder is commercially available and includes, for example, "Mistron Vapor", "Beaver White" and "Furnace Creek", which are supplied by Cyprus Ind. Minerals Co., "Hytron" supplied by Takehara Chem. Ind. Co., and "Symgon" supplied Nippon Talc K.K.

The vulcanizer incorporated in the rubber composition of the present invention usually includes a sulfur vulcanizer or an organic peroxide vulcanizer. The sulfur vulcanizer includes, for example, sulfur such as powdery sulfur, sublimed sulfur, precipitated sulfur, colloidal sulfur, surface-treated sulfur and insoluble sulfur; and sulfur compounds such as sulfur chloride, sulfur dichloride, morpholine disulfide, an alkylphenol disulfide, N,N'-dithio-bis(hexahydro-2H-azepinone-2), phosphorus-containing polysulfide and high-molecular weight polysulfide.

The amount of the sulfur vulcanizer is not particularly limited, but is usually in the range of 0.1 to 15 parts by weight based on 100 parts by weight of the nitrile group-containing highly saturated copolymer rubber.

A vulcanization promoter can be used in combination with the sulfur vulcanizer. As specific examples of the vulcanization promoter, there can be mentioned tetramethylthiuram disulfide, selenium dimethyldithiocarbamate and 2-(4'-morpholinodithio)benzothiazole. The vulcanization promoter used further includes, for example, zinc oxide, stearic acid, and guanidine, aldehyde-amine, aldehyde-ammonia, thiazole, sulfenamide, thiourea and xanthate promoters. The amount of these vulcanization promoters is not particularly limited, but is usually 0.10 to 15 parts by weight based on 100 parts by weight of the nitrile group-containing highly saturated copolymer rubber.

The organic peroxide vulcanizer used is not particularly limited, and conventional organic peroxide vulcanizers can be used. As specific examples of the organic peroxide vulcanizer, there can be mentioned dicumyl peroxide, di-tert.-butyl peroxide, tert.-butylcumyl peroxide, benzoyl peroxide, 2,5-dimethyl-2,5-di(tert.-butyl peroxy)hexyne-3, 2,5-dimethyl-2,5-(benzoyl peroxy)hexyne and α,α'-bis(tert.-butyl peroxy-m-isopropyl)benzene. Of these, di-tert.-butyl peroxide is preferable. The amount of these organic peroxide vulcanizer is usually in the range of 0.01 to 15 parts by weight, preferably 0.1 to 15 parts by weight, based on 100 parts by weight of the nitrile group-containing highly saturated copolymer rubber.

A conventional crosslinking aid can be used in combination with the organic peroxide vulcanizer. As specific examples of the crosslinking aid, there can be mentioned unsaturated compounds such as ethylene glycol dimethacrylate, trimethylolpropane trimethacrylate, polyfunctional methacrylate monomers, N,N'-m-phenylene dimaleimide and triallyl isocyanurate. Of these, triallyl isocyanurate is preferable in view of the properties of the vulcanized rubber. The amount of the crosslinking aid is usually 0.1 to 15 parts by weight based on 100 parts by weight of the rubber.

Auxiliaries which are conventionally used in rubber compositions can be incorporated in the vulcanizable rubber composition of the present invention according to the need. Such auxiliaries include, for example, reinforcing materials such as various types of carbon black, silica and talc, fillers such as calcium carbonate and clay, processing aids, processing oils including plasticizers, antioxidants and antiozonants.

When the nitrile group-containing highly saturated copolymer rubber comprises units of an unsaturated carboxylic acid monomer such as acrylic acid, an oxide of a metal of group II of the periodic table can be incorporated in the rubber composition of the present invention whereby a vulcanizate having an excellent dynamic fatigue resistance can be obtained. The content of the unsaturated carboxylic acid monomer units in the copolymer rubber is preferably in the range of 0.1 to 15% by weight based on the weight of the copolymer rubber. When the content of the unsaturated carboxylic acid monomer units is smaller than 0.1% by weight, the strength and dynamic fatigue resistance of the vulcanizate are usually not improved to a significant degree. In contrast, when the content thereof exceeds 15% by weight, the water resistance of the vulcanizate tends to be lowered. A preferable content is 0.5 to 10% by weight.

As examples of the oxides of a metal of group II of the periodic table, there can be mentioned magnesium oxide, zinc oxide, calcium oxide and strontium oxide. Of these, zinc oxide and magnesium oxide are preferable. The amount of the metal oxide is usually in the range of 0.5 to 30 parts by weight based on 100 parts by weight of the copolymer rubber.

If desired, other rubbers can be incorporated together with the nitrile group-containing highly saturated copolymer rubber in the rubber composition of the present invention. Such rubbers include, for example, an acrylic rubber, a fluororubber, a styrene-butadiene copolymer rubber, an ethylene-propylene-diene terpolymer rubber (EPDM), natural rubber and polyisoprene rubber. If desired, a resin such as an ethylene-vinyl acetate copolymer can also be incorporated in the rubber composition.

The procedure by which the vulcanizable rubber composition of the present invention is prepared not particularly limited. Usually the rubbery material, a vulcanizer, an ultrafine magnesium silicate powder and auxiliaries are mixed and kneaded together by a conventional mixer such as a roll mixer or a Banbury mixer.

The rubber composition of the present invention can be fabricated into various rubber articles, through vulcanization either as it is or as a composite thereof with a reinforcing fibrous material. The rubber articles exhibit good and balanced resistance to permeability to flon gas, i.e., hydrofluorocarbon, hydrochlorofluorocarbon and chlorofluorocarbon gases, and cold resistance, and are used as articles for which flon gas transmission resistance and cold resistance are required. A typical example of the rubber articles is a hose for flon gas, which is made by extruding the vulcanizable rubber composition of the present invention into a tubular shape, and then vulcanizing the tubular extrudate.

The hose made of a vulcanizate of the rubber composition of the present invention exhibits good and balanced resistance to permeation by flon gas and cold resistance, as well as good pressure resistance.

In particular, the hose made of a vulcanizate of the rubber composition of the present invention has a resistance to permeation by flon gas which is expressed as flon-gas transmission of no more than 80 mg mm/cm$^3$, as measured by the method described herein, and a cold resistance of −30° C. or lower as measured by the method also described herein.

The invention will now be described specifically by the following examples. Parts and % in the following examples and comparative examples are by weight unless otherwise specified.

Characteristics of vulcanizable rubber compositions and rubber vulcanizates were determined as follows.

(1) Properties of vulcanizable rubber composition (i) High rate vulcanizability

Using about 10 g of an vulcanized rubber composition prepared according to the recipe shown in Table 3, scorch times ($T_5$ and $T_{95}$ in minutes) and a maximum torque ($V_{max}$ in kgf.cm) at a temperature of 170° C. were determined by an oscillating disc rheometer according to the Standard of Japan Rubber Industrial Society SRIS 3102. The smaller the $T_5$ and $T_{95}$ values, the higher the rate of vulcanization. The larger the $V_{max}$ value, the larger the crosslinking efficiency.

(2) Properties of rubber vulcanizate (i) Tensile strength ($kgf/cm^2$)

According to Japanese Industrial Standard (JIS) K6301, a vulcanizable rubber composition prepared by the recipe shown in Table 3 was vulcanized at a temperature of 170° C. for 20 minutes to give a sheet having a thickness of 2 mm. A #3 dumbbell specimen was cut out from the sheet, and the tensile strength was measured.

(ii) Elongation at break (%)

Elongation at break was measured on a specimen prepared by the same procedure as that for the determination of tensile strength according to JIS K6301.

(iii) Tensile stress at 100% elongation ($kgf/cm^2$)

Tensile stress at 100% elongation was measured on a specimen prepared by the same procedure as that for the determination of tensile strength according to JIS K6301.

(iv) Hardness (JIS-A)

Hardness was measured by using a JIS spring-type A hardness tester according to JIS K6301.

(v) Permanent set (%)

Permanent set was measured after a specimen was maintained at a temperature of 120° C. for 22 hours according to JIS K6301.

(vi) Oil resistance (volume change in %)

Oil resistance was evaluated according to JIS K6301 by the volume change (%) as measured after immersion of a specimen in a #3 lubricating oil having a kinetic viscosity of 31.9 to 34.1, an aniline point of 68.5 to 70.5 and a flash point of 162.7 at a temperature of 120° C. for 72 hours.

(vii) Cold resistance ($T_{10}$ in ° C.)

Cold resistance was evaluated according to JIS K6301 by a Gehman torsional test method, and expressed by the temperature ($T_{10}$ in ° C.) at which the torsion angle reached 10 times of the torsion angle as measured at 23° C. The lower the $T_{10}$, the better the cold resistance.

(viii) Ozone resistance (weather resistance)

Ozone resistance was evaluated by statically drawing a specimen by 20% at a temperature of 40° C. and an ozone concentration of 80 ppm, and crack occurrence was observed after the drawn specimen was allowed to stand for 12, 24, 48 and 72 hours.

(ix) Resistance to permeation by hydrofluorocarbon gas

A disc specimen having a thickness of 0.2 mm and a diameter of 78 mm was fixed to a transmitting cell placed in a thermostatic chamber. Flon R-134a (hydrofluorocarbon gas, $CH_2FCF_3$) was introduced into one end of the cell so that the inner pressure was raised to 4 $kg/cm^2$, and the other end of the cell was maintained at an atmospheric pressure. After the specimen was allowed to stand for 24 hours, the amount ($mg.mm/cm^2$) of flon R-134a transmitted through the cell for a predetermined time was measured by the pressure change of flon R-134a. The measurement was repeated 5 to 10 times on the same specimen, and the resistance to permeation by flon R-134a was expressed by the average value. The larger the value of the amount of flon gas transmission, the poorer the resistance to permeation by flon gas.

EXAMPLES 1 TO 6 AND COMPARATIVE EXAMPLES 1 AND 2

Acrylonitrile-butadiene-unsaturated carboxylic acid ester copolymers were prepared by a conventional emulsion polymerization procedure, and then the copolymers were hydrogenated by using a palladium-containing catalyst to give the nitrile group-containing highly saturated copolymer rubbers (HNBR-1 to HNBR-4) shown in Table 1.

An ultrafine magnesium silicate powder shown in Table 2 and other auxiliaries were incorporated in each nitrile group-containing highly saturated copolymer rubber according to the recipe shown in Table 3 to prepare a vulcanizable rubber composition. The properties of the vulcanizable rubber composition and the vulcanizates were evaluated by the above-mentioned methods. The results are shown in Table 4.

In Comparative Example 1, the above-mentioned procedures was repeated for the preparation of the acrylonitrile-butadiene-unsaturated carboxylic acid ester copolymer, the hydrogenated copolymer rubber "HNBR-4" and the vulcanizable rubber composition and for the evaluation of the rubber composition, wherein FEF carbon black was incorporated instead of the ultrafine magnesium silicate powder in the vulcanizable rubber composition. All other conditions remained substantially the same.

In Comparative Example 2, the above-mentioned procedures were repeated wherein an acrylonitrile-butadiene copolymer was prepared instead of the acrylonitrile-butadiene-unsaturated carboxylic acid ester copolymer, and the acrylonitrile-butadiene copolymer was hydrogenated by the same procedures as those described above, to give a nitrile group-containing highly saturated copolymer rubber (HNBR-5) shown in Table 1. All other conditions remained substantially the same.

As seen from Table 4, the vulcanizable rubber composition of the present invention gives a vulcanizate having good and balanced resistance to permeation by flon gas, and cold resistance. When an ultrafine magnesium silicate powder is not incorporated, the resulting rubber vulcanizate has a poor resistance to permeation by flon gas (Comparative Example 1). When the nitrile group-containing highly saturated copolymer rubber does not contain units of an unsaturated carboxylic acid ester units, the rubber vulcanizate has a poor cold resistance (Comparative Example 2).

TABLE 1

| | Nitrile Group-Containing Highly Saturated Copolymer Rubber | | | | |
|---|---|---|---|---|---|
| | HNBR-1 | HNBR-2 | HNBR-3 | HNBR-4 | HNBR-5 |
| Bound acrylonitrile content (%) | 15 | 15 | 15 | 25 | 35 |
| Unsaturated carboxylic acid ester units in copolymer (%) | | | | | |
| Di-n-butyl itaconate | 50 | — | — | 30 | — |
| n-Butyl acrylate | — | 50 | — | — | — |

TABLE 1-continued

Nitrile Group-Containing Highly Saturated Copolymer Rubber

|  | HNBR-1 | HNBR-2 | HNBR-3 | HNBR-4 | HNBR-5 |
|---|---|---|---|---|---|
| Trifluoroethyl acrylate | — | — | 50 | — | — |
| Iodine value | 15 | 15 | 15 | 15 | 11 |
| Mooney viscosity | 90 | 90 | 90 | 95 | 85 |

TABLE 2

Ultrafine Magnesium Silicate Powder

|  | Surface area ($m^2/g$) | Average particle diameter ($\mu m$) | $SiO_2$ (%) | MgO (%) | pH |
|---|---|---|---|---|---|
| Mistron Vapor* | 20 | 0.32 | 62.5 | 30.6 | 9–9.5 |
| Beaver White* | 8 | 6 | 61 | 32 | 9 |
| Furnace Creek* | 3 | 8 | 58 | 26 | 9 |

*The three kinds of magnesium silicate powders were supplied by Cyprus Ind. Minerals Co.

TABLE 3

Vulcanizable Rubber Composition

|  | Example | | | | | | Comp. Example | |
|---|---|---|---|---|---|---|---|---|
|  | 1 | 2 | 3 | 4 | 5 | 6 | 1 | 2 |
| Copolymer rubber | | | | | | | | |
| HNBR-1 | 100 | — | — | — | — | — | — | — |
| HNBR-2 | — | 100 | — | — | — | — | — | — |
| HNBR-3 | — | — | 100 | — | — | — | — | — |
| HNBR-4 | — | — | — | 100 | 100 | 100 | 100 | — |
| HNBR-5 | — | — | — | — | — | — | — | 100 |
| Ultrafine Mg silicate | | | | | | | | |
| Mistron Vapor | 80 | 80 | 80 | 80 | — | — | — | 80 |
| Beaver White | — | — | — | — | 80 | — | — | — |
| Furnace Creek | — | — | — | — | — | 80 | — | — |
| FEF carbon black | — | — | — | — | — | — | 80 | — |
| Nauguard 445 *1 | 1 | 1 | 1 | 1 | 1 | 1 | 1 | 1 |
| MBZ *2 | 1 | 1 | 1 | 1 | 1 | 1 | 1 | 1 |
| Silane-A-172 *3 | 2 | 2 | 2 | 2 | 2 | 2 | 2 | 2 |
| Vulcup 40KE *4 | 10 | 10 | 10 | 10 | 10 | 10 | 10 | 10 |

*1 Substituted diphenylamine aging stabilizer
*2 Mercaptobenzothiazole aging stabilizer
*3 Vinyl-tris($\alpha$-methoxyethoxy) silane
*4 $\alpha,\alpha'$-bis(tert.-butylperoxy-m-isopropyl)benzene

TABLE 4

Properties of Rubber Composition and Rubber Vulcanizate

|  | Example | | | | | | Comp. Example | |
|---|---|---|---|---|---|---|---|---|
|  | 1 | 2 | 3 | 4 | 5 | 6 | 1 | 2 |
| High rate vulcanizability | | | | | | | | |
| Scorch time $T_5$ (min) | 2.5 | 2.5 | 2.4 | 2.5 | 2.4 | 2.7 | 2.1 | 2.1 |
| Scorch time $T_{65}$ (min) | 18.8 | 18.6 | 18.0 | 19.2 | 18.8 | 19.9 | 19.9 | 19.0 |
| $V_{max}$ (kgf · cm) | 112 | 113 | 111 | 118 | 111 | 123 | 123 | 120 |
| Properties of Vulcanizate | | | | | | | | |
| Tensile strength (kgf/cm$^2$) | 105 | 105 | 95 | 134 | 121 | 110 | 152 | 198 |
| Elongation (%) | 220 | 210 | 220 | 220 | 210 | 210 | 200 | 250 |
| 100% tensile stress (kgf/cm$^2$) | 73 | 78 | 68 | 95 | 82 | 79 | 101 | 103 |
| Hardness (JIS-A) | 72 | 71 | 72 | 75 | 77 | 77 | 81 | 82 |
| Permanent set (%) | 40 | 43 | 40 | 39 | 41 | 40 | 21 | 38 |
| Oil resistance | +42 | +48 | +40 | +31 | +32 | +31 | +30 | +23 |

TABLE 4-continued

Properties of Rubber Composition and Rubber Vulcanizate

|  | Example | | | | | | Comp. Example | |
|---|---|---|---|---|---|---|---|---|
|  | 1 | 2 | 3 | 4 | 5 | 6 | 1 | 2 |
| Volume change (%) | | | | | | | | |
| Cold resistance $T_{10}$ (°C.) | −38 | −32 | −36 | −31 | −30 | −30 | −31 | −25 |
| Resistance to Flon gas transmission (mg mm/cm$^2$) | 51.0 | 57.5 | 48.0 | 42.5 | 48.1 | 50.0 | 91.5 | 22.3 |
| Ozone resistance | | | | | | | | |
| 12 hours | NC | NC | NC | NC | NC | NC | NC | NC |
| 24 hours | NC | NC | NC | NC | NC | NC | NC | NC |
| 48 hours | NC | NC | NC | NC | NC | NC | NC | NC |
| 72 hours | NC | NC | NC | NC | NC | NC | NC | NC |

NC: crack did not occur

What is claimed is:

1. A vulcanizable rubber composition comprising a nitrile group-containing highly saturated copolymer rubber, an ultrafine magnesium silicate powder, in an amount of 20 to 200 parts by weight based on 100 parts by weight of said rubber, having an average particle diameter of not larger than 10 μm and a vulcanizer, in an amount of 0.1 to 15 parts by weight based on 100 parts by weight of said rubber; said nitrile group-containing highly saturated copolymer rubber being obtained by hydrogenating the conjugated diene part of an unsaturated nitrile-conjugated diene-unsaturated carboxylic acid ester copolymer.

2. A vulcanizable rubber composition according to claim 1, wherein the unsaturated nitrile is selected from the group consisting of acrylonitrile, methacrylonitrile and α-chloroacrylonitrile.

3. A vulcanizable rubber composition according to claim 1, wherein the conjugated diene is selected from the group consisting of 1,3-butadiene, 2,3-dimethylbutadiene, isoprene and 1,3-pentadiene.

4. A vulcanizable rubber composition according to claim 1, wherein the unsaturated carboxylic acid ester is selected from the group consisting of acrylates having an alkyl group with 1 to about 18 carbon atoms, methacrylates having an alkyl group with 1 to about 18 carbon atoms, acrylates having an alkoxyalkyl group with 1 to about 12 carbon atoms, acrylates having a cyanoalkyl group with 2 to about 12 carbon atoms, acrylates having a hydroxyalkyl group with 1 to about 8 carbon atoms, monoalkyl esters and dialkyl esters of unsaturated dicarboxylic acids, which have an alkyl group with 1 to about 8 carbon atoms, amino group-containing esters of unsaturated carboxylic acids, acrylates having a fluoroalkyl group with 1 to about 10 carbon atoms, methacrylates having a fluoroalkyl group with 1 to about 10 carbon atoms, fluorine-substituted benzyl acrylates, and fluorine-substituted benzyl methacrylates.

5. A vulcanizable rubber composition according to claim 1, wherein the unsaturated nitrile-conjugated diene-unsaturated carboxylic acid ester copolymer comprises 10 to 40% by weight of unsaturated nitrile units, 10 to 70% by weight of conjugated diene units, 1 to 80% by weight of unsaturated carboxylic acid ester units, based on the weight of said copolymer.

6. A vulcanizable rubber composition according to claim 1, wherein the unsaturated nitrile-conjugated diene-unsaturated carboxylic acid ester copolymer comprises acrylonitrile as the unsaturated nitrile, 1,3-butadiene as the conjugated diene, and a monoalkyl ester or dialkyl ester of an unsaturated dicarboxylic acid as the unsaturated carboxylic acid ester.

7. A vulcanizable rubber composition according to claim 1, wherein the nitrile group-containing highly saturated copolymer rubber has an iodine value of not larger than 80 and a Mooney viscosity of 15 to 200.

8. A vulcanizable rubber composition according to claim 1, wherein the ultrafine magnesium silicate powder is composed of flat-shaped particles and is made by pulverizing and classifying hydrous magnesium silicate and then calcining the classified product.

9. A vulcanizable rubber composition according to claim 1, wherein the vulcanizer is an organic peroxide vulcanizer or a sulfur vulcanizer.

10. A hose for a hydrofluorocarbon, hydrochlorofluorocarbon or chlorofluorocarbon gas, which is made of a vulcanizate of a vulcanizable rubber composition comprising a nitrile group-containing highly saturated copolymer rubber, an ultrafine magnesium silicate powder, in an amount of 20 to 200 parts by weight based on 100 parts by weight of said rubber, having an average particle diameter of not larger than 10 μm and a vulcanizer, in an amount of 0.1 to 15 parts by weight based on 100 parts by weight of said rubber; said nitrile group-containing highly saturated copolymer rubber being obtained by hydrogenating the conjugating diene part of an unsaturated nitrile-conjugated diene-unsaturated carboxylic acid ester copolymer.

11. A hose according to claim 10, wherein the unsaturated nitrile is selected from the group consisting of acrylonitrile, methacrylonitrile and α-chloroacrylonirile.

12. A hose according to claim 10, wherein the conjugated diene is selected from the group consisting of 1,3-butadiene, 2,3-dimethylbutadiene, isoprene and 1,3-pentadiene.

13. A hose according to claim 10, wherein the unsaturated carboxylic acid ester is selected from the group consisting of acrylates having an alkyl group with 1 to about 18 carbon atoms, methacrylates having an alkyl group with 1 to about 18 carbon atoms, acrylates having an alkoxy-alkyl group with 1 to about 12 carbon atoms, acrylates having a cyanoalkyl group with 2 to about 12 carbon atoms, acrylates having a hydroxyalkyl group with 1 to about 8 carbon atoms, monoalkyl esters and dialkyl esters of unsaturated dicarboxylic acids, which have an alkyl group with 1 to about 8 carbon atoms, amino group-containing esters of unsaturated carboxylic acids, acrylates having a fluoroalkyl group with 1 to about 10 carbon atoms, methacrylates having a fluoroalkyl group with 1 to about 10 carbon atoms, fluorine-substituted benzyl acrylates, and fluorine-substituted benzyl methacrylates.

14. A hose according to claim 10, wherein the unsaturated nitrile-conjugated diene-unsaturated carboxylic acid ester copolymer comprises 10 to 40% by weight of unsaturated nitrile units, 10 to 70% by weight of conjugated diene units, 1 to 80% by weight of unsaturated carboxylic acid ester units, based on the weight of said copolymer.

15. A hose according to claim 10, wherein the unsaturated nitrile-conjugated diene-unsaturated carboxylic acid ester copolymer comprises acrylonitrile as the unsaturated nitrile, 1,3-butadiene as the conjugated diene, and a monoalkyl ester or dialkyl ester of an unsaturated dicarboxylic acid as the unsaturated carboxylic acid ester.

16. A hose according to claim 10, wherein the nitrile group-containing highly saturated copolymer rubber has an iodine value of not larger than 80 and a Mooney viscosity of 15 to 200.

17. A hose according to claim 10, wherein the ultra-fine magnesium silicate powder is composed of flat-shaped particles and is made by pulverizing and classifying hydrous magnesium silicate and then calcining the classified product.

18. A hose according to claim 10, wherein the vulcanizer is an organic peroxide vulcanizer or a sulfur vulcanizer.

* * * * *